Aug. 21, 1945.    C. A. LEE    2,382,999
CIRCULATING WATER CHANNEL
Filed Oct. 6, 1943
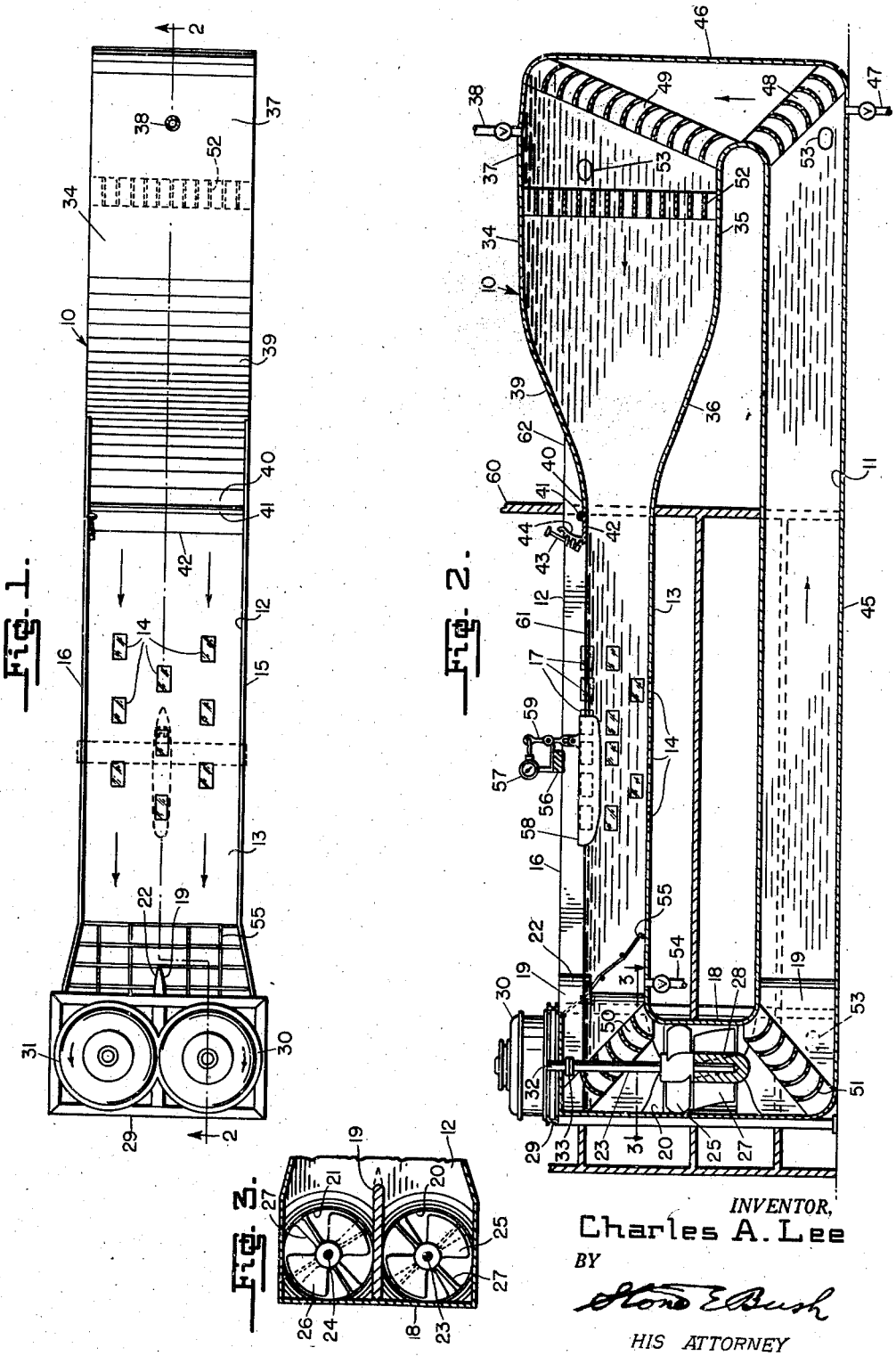
INVENTOR,
Charles A. Lee
BY
HIS ATTORNEY Patented Aug. 21, 1945

2,382,999

UNITED STATES PATENT OFFICE 2,382,999

CIRCULATING WATER CHANNEL

Charles A. Lee, United States Navy, Laramie, Wyo.

Application October 6, 1943, Serial No. 505,149

11 Claims. (Cl. 73—148)

(Granted under the act of March 3, 1883, as amended April 30, 1928; 370 O. G. 757)

The invention relates to improvements in hydrodynamic testing apparatus and more specifically to a circulating water channel for testing ship models and performing other hydraulic experiments.

It has been common practice to tow scale models of ships, boats and special nautical devices through still water in relatively long testing basins for the purpose of improving the design of such equipment. When a towing carriage is used, it is first accelerated to the desired speed at the beginning of the test run, and it must be brought to a stop before the end of the testing basin is reached. Since the actual test period is relatively short, it is usually necessary to make numerous test runs in order to secure the desired performance data. While accurate results may be obtained by the towing method, the length of the test periods is limited by the dimensions of the basin, and the loss of time between test runs is considerable. Also the inability to observe underwater phenomena from above during towing, due to surface disturbances and lack of illumination, has interfered with the making of certain types of tests.

It is, therefore, an important object of the present invention to provide a circulating water channel for continuously testing scale models of ships, boats and nautical devices.

Another important object of the invention is to provide means permitting the making of visual observations and photographs from the side or from below the object being tested.

Still another important object is to provide a testing device of the character described whereby the various hydrodynamic forces exerted on the object under test may be measured by methods similar to those utilized in conventional towing basins.

Another object of the invention is to provide a water channel with means for producing a continuous uniformly flowing stream of water through the channel.

A further object is the provision of a circulating water duct forming a loop in a vertical plane with a water channel in the upper portion of the loop.

Yet another object resides in the provision of apparatus of the character described which is so arranged as to require a relatively small amount of power for its operation and wherein a plurality of motors is used.

A still further object of the invention is to provide means for circulating water through the channel including propeller pumps so arranged that their thrust is counteracted by the weight of the propeller, shaft and motor assembly.

A further object is to provide a device of the character described which is so designed as to employ a plurality of large synchronous motorized pumps.

An additional object of the invention is the provision of means for circulating water through a vertically arranged loop having a channel in its upper portion, including propeller shafts so arranged as to not require water-tight packing.

The invention also aims to provide means for converging the flow of water entering the water channel so as to produce a substantially uniform velocity throughout the channel.

The invention also has for an object to provide means for smoothing the surface of the stream of water flowing into the channel.

Other objects and advantages of the invention will become apparent during the course of the following detailed description, taken in connection with the accompanying drawing, forming a part of this specification, and in which drawing, Figure 1 is a top plan view of the apparatus.

Figure 2 is a vertical longitudinal sectional view of the apparatus, taken substantially on the line 2—2 of Figure 1.

Figure 3 is a fragmentary horizontal sectional view taken substantially on the line 3—3 of Figure 2.

In the drawing, which for the purpose of illustration shows only a preferred embodiment of the invention, and wherein similar reference characters denote corresponding parts throughout the several views, the numeral 10 generally designates the hydrodynamic testing apparatus, comprising a duct 11 forming a loop in a vertical plane and including a substantially horizontal water channel section 12 in the upper portion of the loop.

This water channel section 12 comprises a flat and essentially horizontal bottom wall 13 provided with transparent watertight observation panels 14, and spaced parallel upright side walls 15, 16, provided with transparent watertight observation panels 17.

Extending downwardly from the outlet end of the water channel section 12 is a vertical pump and diffuser section 18 bisected by a central vertical partition 19 forming a pair of passageways 20, 21. This partition 19 at its upper portion divides the outlet end of the water channel section and is provided with any suitable leading edge 22. In the example shown, the leading edge 22 includes a wedge shaped upper portion and a rounded lower portion.

Extending downwardly through the outlet end of the water channel and into the passageways 20, 21 of the pump section are propeller shafts 23, 24 provided with conventional adjustable pitch propellers 25, 26. Fixed in the passageways 20, 21 subjacent the propellers, are radially disposed diffuser vanes 27 supporting stationary hub-like fairwaters 28 in which the lower ends of the propeller shafts 23, 24 are journaled.

Mounted on a suitable platform 29 above the outlet end of the channel are synchronous constant speed electric motors 30, 31, having vertical driveshafts 32 fastened to the upper ends of the propeller shafts at flanges 33. The motors are arranged to drive the propellers in opposite directions as indicated by the arrows in Figure 1.

The upper portion of the loop includes a tubular nozzle section 34 for directing a substantially uniformly flowing stream of water into the inlet end of the water channel section 12. This nozzle section 34 is of a width equal to that of the water channel section 12, but vertically, it is enlarged and tapers toward the inlet end of the water channel section 12. As shown in Figure 2, the bottom of this nozzle section 13 includes a horizontal wall 35 and a wall 36 inclining upwardly toward the bottom wall 13 of the water channel. The top of the nozzle section includes a slightly domed wall 37 provided with a valve controlled vent pipe 38, and a downwardly inclining wall 39 terminating in a transverse edge 40 below the top of the inlet end of the water channel section 12. Pivoted to the transverse edge 40, as by a waterproof hinge 41, is a flap 42 provided with means, such as the worm 43 and sector 44, for setting the flap 42 in any one of a plurality of positions of adjustment.

Extending between the lower end of the pump and diffuser section 18 and the vertically enlarged inlet end of the nozzle section 34 are horizontal and vertical return ducts 45, 46, respectively. The return duct 45 is of uniform cross-sectional area and preferably is slightly downwardly inclined toward a valve-controlled drain pipe 47.

In order to facilitate uniform flow of water around the loop, suitable sets 48—51 of curved vanes may be fitted in the elbows joining the horizontal and vertical lengths of the loop. In addition, a honeycomb vane assembly 52 may be fixed in the vertically enlarged nozzle section 34, to equalize the flow of water therethrough.

A plurality of water-tight releasable manhole closures 53 are provided to facilitate access to the interior of the loop, and a valve-controlled drain pipe 54 is placed in the bottom wall 13 so that the water channel section may be emptied. The discharge end of the water channel section is provided with an inclined safety screen 55.

Merely for the purposes of illustration, I have shown diagrammatically in Figure 2, a transverse bridge member 56 carrying a dynamometer 57 operatively connected to a ship model 58, as by suitable linkage 59, but it will be readily understood that a more elaborate form of bridge carrying any desired number and type of meters may be employed. Although the testing apparatus may be of any desired size, at present I prefer to provide a circulating water channel large enough to test 20 to 30 foot models and to provide a special building 60 having floors at convenient levels so as to expedite the work of the operating personnel.

The capacity of the water channel section 12 above the surface 61 of the stream is at least as great as the capacity of the vertically enlarged nozzle section 34 above the level of the top 62 of the water channel section. Thus, by filling the loop with water up to the top 62 of the water channel and then withdrawing the air in the upper portion of the nozzle section 34 through the pipe 38, as by a suitable suction pump (not shown), sufficient water from the channel section 12 may be transferred to the nozzle section 34 to completely fill the upper portion thereof.

In order to assure good underwater visibility of the object being tested, a conventional filter plant (not shown) is connected to the loop so as to remove any foreign material therefrom.

The operation of the apparatus will now be described. When the motors 30, 31 are energized, the propellers 25, 26 rotate in opposite directions so as to circulate the water through the loop in a counter-clockwise direction, as viewed in Figure 2. The radially disposed diffuser vanes 27 subjacent the propellers tend to prevent swirling of the water in the passageways 20, 21. The head of water maintained in reserve in the upper portion of the nozzle section permits the water to flow uniformly and at a high velocity through the channel section 12. In order to compensate for variations in the head of water between the inlet and outlet ends of the water channel at different operating speeds, a suitable quantity of water is drained from or added to the loop, depending on whether the operating speed is increased or decreased. The pivoted flap 42 may be adjusted to a position wherein any ripples on the surface of the stream are reduced to a minimum.

Various changes may be made in the form of invention herein shown and described without departing from the spirit of the invention or the scope of the following claims.

This invention may be manufactured and/or used by or for the Government of the United States of America without the payment of any royalty thereon or therefor.

I claim:

1. In testing apparatus of the character described, a duct forming a loop in a vertical plane and including a substantially horizontal open water channel section in the upper portion of the loop and a vertically disposed tubular section extending downwardly from the channel section, said loop being adapted to contain water below a given level in the channel section, a propeller shaft extending downwardly through the open water channel section into the tubular section and thus intersecting said water level so as to not require a shaft packing at the zone of entrance of the shaft into the water, a propeller fixed on the shaft within the tubular section, and means disposed above said water level for driving the shaft.

2. In hydrodynamic testing apparatus, a duct forming a loop in a vertical plane and including a substantially horizontal open water channel section in the upper portion of the loop, said channel section having a discharge end, a vertical tubular section extending downwardly from the discharge end, said loop being adapted to contain water below a given level in the channel section, a vertical shaft extending through said discharge end and into said tubular section and thus intersecting said water level so as to not require a shaft packing at the zone of entrance of the shaft into the water, a propeller on the shaft for forcing water downwardly through the tubular section, and a motor above the discharge end for driving the shaft whereby the upward thrust reaction of the water on the propeller is at least partially balanced by the gravitational force exerted on said propeller, shaft and motor.

3. In hydrodynamic testing apparatus, a duct forming a loop in a vertical plane and including a substantially horizontal open water channel in the upper portion of the loop, said channel having a discharge end, a vertically disposed tubular section extending downwardly from said discharge end, said loop being adapted to contain water below a given level in the channel, means dividing said tubular section into a plurality of vertical passageways, said dividing means including a vertically extending leading marginal edge at the discharge end of said channel for splitting the water entering said tubular section from said channel, said leading marginal edge including portions disposed above and below said water level and shaped to reduce turbulence and interference with the smooth flow of water in said channel, propeller shafts extending downwardly through the discharge end of the channel one into each of said passageways, propellers fixed on said shafts one in each of said passageways, and individual motors for driving said shafts each in a direction such that said propellers force said water downwardly through said vertical passageways.

4. In hydrodynamic testing apparatus, a horizontal open water channel having an inlet end and means for directing a substantially uniform stream of water into said inlet end including a tubular duct communicating with said inlet end, said duct being of a uniform width substantially equal to that of the water channel, the height of said duct decreasing toward said inlet end.

5. In hydrodynamic testing apparatus, a horizontal open water channel having an inlet end, a substantially flat bottom and upright sides, and means for directing a substantially uniform stream of water into said inlet end including a tubular duct of uniform width communicating with said inlet end, said duct having upright sides aligning with the sides of the channel, a bottom inclining upwardly toward the bottom of the channel and a top inclining downwardly toward the inlet end of the channel and terminating in an edge substantially determining the height of said stream of water in the channel.

6. In hydrodynamic testing apparatus, a water channel having an inlet end, means for directing a stream of water into said inlet end, and means for smoothing the surface of said stream including a flap providing a horizontal edge for contacting the surface of said stream transversely of the direction of flow.

7. In hydrodynamic testing apparatus, a water channel having an inlet end, means for directing a stream of water into said inlet end, and means for smoothing the surface of said stream including a flap, means hinging the flap for movement of its free edge into and out of contact with the surface of said stream transversely of the direction of flow, and means releasably securing the flap in any one of a plurality of set positions.

8. In hydrodynamic testing apparatus, a water channel having an inlet end, and means for directing a substantially smooth stream of water into said inlet end including a tubular duct having a top wall inclining downwardly toward the inlet end, said top wall terminating in a transverse edge at substantially the desired height of said stream in the channel, a flap pivoted along said edge, and means releasably securing the flap in any one of a plurality of set positions.

9. In a testing device of the class described, a duct forming a loop in a vertical plane and including a substantially horizontal open water channel in the upper portion of the loop, said channel having an inlet end, a tubular section communicating with said inlet end and including a top wall inclining downwardly toward said inlet end, means for propelling a stream of water through said tubular section in the direction of said water channel, and means for withdrawing air from the upper portion of said tubular section so as to produce a higher water level in the tubular section than the water level in the open water channel.

10. In testing apparatus of the character described, a duct forming a loop in a vertical plane and including a substantially horizontal water channel in the upper portion of the loop, said channel having an inlet end, a tubular section leading to said inlet end and having a top wall inclining downwardly toward said inlet end, said top wall terminating in an edge below the top of the water channel for determining the height of a stream of water in the channel, the capacity of the channel above the surface of said stream being at least equal to the capacity of said tubular section above the level of the top of the water channel, and means for withdrawing air from the top of the tubular section.

11. The combination with a substantially horizontal open water channel having an inlet end, of a tubular vertically enlarged nozzle of uniform width having a chamber communicating with said inlet end, the upper portion of said chamber being disposed above a given level in said water channel, and means for introducing water into said chamber.

CHARLES A. LEE.